US007014882B2

(12) United States Patent
Ataka et al.

(10) Patent No.: US 7,014,882 B2
(45) Date of Patent: Mar. 21, 2006

(54) MAGNETIC RECORDING MEDIUM AND MANUFACTURING METHOD THEREOF

(75) Inventors: Toyoji Ataka, Nagano (JP); Satoru Nakamura, Nagano (JP); Katsuya Masuda, Nagano (JP); Ryoichi Kadota, Nagano (JP); Yuji Ando, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/388,366

(22) Filed: Mar. 13, 2003

(65) Prior Publication Data

US 2004/0009372 A1 Jan. 15, 2004

(30) Foreign Application Priority Data

Mar. 13, 2002 (JP) ............................ 2002-069260
Mar. 4, 2003 (JP) ............................ 2003-056928

(51) Int. Cl.
*B05D 5/12* (2006.01)

(52) U.S. Cl. ...................... 427/129; 427/130; 427/131

(58) Field of Classification Search ................ 427/129, 427/130, 131
See application file for complete search history.

(56) References Cited

U.S. PATENT DOCUMENTS 5,879,783 A * 3/1999 Chang et al. ............... 428/141
2003/0199680 A1 * 10/2003 Sakawaki et al. .......... 536/23.2

FOREIGN PATENT DOCUMENTS

JP 2001-331934 * 11/2001

OTHER PUBLICATIONS

"Effects of Surface Oxidation of Amorphous Ni-Based Alloy Seed Layers on Noise in CoCrPt/CrTi Media"; Matsuda et al.; IEEE Transactions on Magnetics, vol. 37, No. 4; Jul. 2001;pp. 3053-3055.

* cited by examiner

*Primary Examiner*—Holly Rickman
(74) *Attorney, Agent, or Firm*—Rossi, Kimms & McDowell, LLP

(57) ABSTRACT

A high-density magnetic recording medium uses a nonmetallic substrate, while still providing high in-plane magnetic anisotropy and remanent coercivity. Such a medium can be formed by depositing a seed layer on a textured surface of the nonmetallic substrate in a gas mixture containing oxygen or nitrogen and an inert gas, while controlling the oxygen concentration or nitrogen concentration, and subsequently exposing the surface of the seed layer to oxygen or nitrogen.

9 Claims, 10 Drawing Sheets

MAGNETIC RECORDING MEDIUM AND MANUFACTURING METHOD THEREOF

BACKGROUND

Conventionally, metal substrates of an aluminum alloy or the like have been widely used as substrates of magnetic recording media. These metal substrates are processed to form circular grooves on their surfaces, which grooves are referred to as a texture. The texturing on the substrate surface prevents the magnetic head from contacting the recording medium to prevent wear, which can happen when the magnetic head flies over the magnetic recording medium during seeking, and to orient the in-plane magnetization direction in the circumferential direction, which is the recording direction. High-density magnetic recording can be formed with an "anisotropic medium," where magnetic anisotropy is formed in the medium plane (in-plane magnetic anisotropy). The output characteristics of the recording medium correspond to the product of the magnetic layer thickness and the remanent magnetization (hereinafter described as thickness remanent magnetization product (Mrt)).

With a medium having in-plane magnetic anisotropy, where the output characteristic corresponding to the thickness remanent magnetization product (Mrt) in the circumferential direction is set to constant, the remanent magnetization (Mrt) in the circumferential direction is higher than in the case of an in-plane isotropic medium. Thus, the magnetic layer can be made thinner and medium noise caused by the magnetic layer can be reduced. Since the S/N ratio (signal-to-noise ratio) and so on can be improved, a high-density recording medium can be obtained. Note that the ratio between the thickness remanent magnetization product in the circumferential direction (Mrt(Cir)) and the thickness remanent magnetization product in the radial direction (Mrt (Rad)), namely (O.R.-Mrt=Mrt(Cir)/Mrt(Rad)) can be used as an indicator of the in-plane magnetic anisotropy. The larger O.R.-Mrt, the larger the in-plane magnetic anisotropy.

At present, so-called "isotropic media" are the mainstream magnetic recording media that use a nonmetallic substrate, such as a glass substrate or a ceramic substrate. But anisotropic magnetic recording media that use a nonmetallic substrate are being contemplated. Compared with an anisotropic magnetic recording medium that uses a metallic substrate, an anisotropic magnetic recording medium that uses a nonmetallic substrate has better shock resistance for use in mobile equipment, and higher smoothness for realizing high-speed rotation for a high-speed server, i.e., higher rigidity. On the other hand, a magnetic recording medium that uses a nonmetallic substrate, even if texturing is carried out on the surface of the nonmetallic substrate, it is difficult to form a magnetic layer having a sufficient in-plane magnetic anisotropy. This is due to the thin film crystal orientation and the grain diameter being different and the thermal expansion of the substrate being small compared with that of the metallic substrate.

Obtaining a magnetic recording medium that uses a textured nonmetallic substrate is difficult as described above, but proposals to overcome the noted problem have been made. For instance, Japanese Patent Application Laid-open No. 2001-331934 discloses that by sputtering in oxygen or nitrogen environment to deposit an orientation adjusting film that adjusts the orientation of a film immediately thereupon having Ni—P as a principal component onto a nonmetallic substrate of glass or the like that has been subjected to texturing, then oxidizing the surface of the orientation adjusting film, and then depositing a nonmagnetic underlayer and a magnetic film on the orientation adjusting film that has been subjected to oxidation treatment without removing the medium substrate from the film-depositing apparatus, magnetic anisotropy can be created in the medium plane to obtain a high-density recording medium using a manufacturing process that is simpler.

Recently, however, the recording density of magnetic recording media has continued to increase at an ever greater rate, and hence magnetic recording media enabling the realization of yet higher density magnetic recording are desired. If the magnetic recording density is increased with an in-plane magnetic recording medium, the area of the medium per recorded bit becomes smaller, and hence the playback output drops, and playback becomes difficult. Although the playback problem can be improved by using a high-sensitivity head (which increases the playback output), the medium noise is amplified at the same time to make reading of recorded information difficult. To make an in-plane magnetic recording medium have high recording density, it is essential to reduce the medium noise. Moreover, to win out over the diamagnetic field from magnetization at bit boundaries and maintain the magnetization in the recording direction, it is necessary to increase the remanent coercivity (Hcr), and also reduce the thickness remanent magnetization product to reduce the diamagnetic field. The "remanent coercivity (Hcr)" refers to the coercivity in the remanent curve obtained through measurement of magnetic relaxation (remanence). If medium noise is reduced by reducing the thickness of the magnetic layer and decreasing the crystal grain size of the magnetic layer, the remanent coercivity drops dramatically and the playback output drops dramatically, and also the thermal stability of the recording magnetization state becomes poor so that loss of recorded information becomes problematic. On the other hand, as described above, by increasing the in-plane magnetic anisotropy, the medium noise caused by the magnetic layer can be reduced to improve the S/N ratio. Moreover, a high remanent coercivity also becomes necessary as one factor for maintaining the playback output, i.e., improving the thermal stability.

There is a need for a high-density magnetic recording medium that uses a nonmetallic substrate having both the high in-plane magnetic anisotropy and the high remanent coercivity, while reducing medium noise to improve the S/N ratio. The present invention addresses this need.

SUMMARY OF THE INVENTION

The present invention relates to a method of manufacturing a magnetic recording medium for use in any of various magnetic recording devices, such as an external storage device for a computer, and the magnetic recording medium thereof, and the magnetic recording medium itself.

One aspect of the present invention is a method of manufacturing a magnetic recording medium. The method involves texturing a surface of a nonmetallic substrate, depositing a seed layer composed of one of Ni—P, Ni—Nb, and W—Nb on the nonmetallic substrate, exposing the surface of the seed layer to a gas containing at least one of oxygen or nitrogen, depositing a nonmagnetic underlayer on the seed layer, and depositing a magnetic layer on magnetic.

If the seed layer is composed of Ni—P, the seed layer can be deposited on the nonmetallic substrate in a gas mixture containing oxygen and an inert gas, the concentration of oxygen being 0.15 to 0.55 vol %. More preferably, the oxygen can be 0.20 to 0.45 vol %. The resulting magnetic recording medium can achieve an in-plane magnetic anisotropy of at least 1.50, and a remanent coercivity of at least 3500 Oe. More specifically, the magnetic recording medium can achieve an in-plane magnetic anisotropy of at least 1.60, and a remanent coercivity of at least 3700 Oe.

If the seed layer is composed of W—Nb, the seed layer can be deposited on the nonmetallic substrate in a gas containing a mixture of nitrogen and other inert gas, the concentration of nitrogen being 1.8 to 3.6 vol %. More perferably, the nitrogen concentration can be 1.8 to 2.7 vol %. The resulting magnetic recording medium can achieve an in-plane magnetic anisotropy of at least 1.30, and a remanent coercivity of at least 2800 Oe. More specifically, the recording medium can achieve an in-plane magnetic anisotropy of at least 1.40, and a remanent coercivity of at least 3500 Oe.

If the seed layer is composed of Ni—Nb, the seed layer can be deposited on the metallic substrate in a gas mixture containing nitrogen and other inert gas, the concentration of nitrogen being 0.4 to 3.6 vol %. More preferably, the nitrogen concentration can 0.4 to 0.9 vol %. The resulting magnetic recording medium can achieve an in-plane magnetic anisotropy of at least 1.40, and a remanent coercivity of at least 3200 Oe. More specifically, the magnetic recording medium can achieve an in-plane magnetic anisotropy of at least 1.45, and a remanent coercivity of at least 3600 Oe.

Another aspect of the present invention is a magnetic recording medium made by the above method.

Another aspect of the present invention is a magnetic recording medium having the nonmetallic substrate having a textured surface, the seed layer composed of one of Ni—P, Ni—Nb, and W—Nb formed on the substrate, the nonmagnetic underlayer formed on the seed layer; and the magnetic layer formed on the nonmagnetic underlayer. The magnetic recording medium has an in-plane magnetic anisotropy and a remanent coercivity as disclosed above

DETAILED DESCRIPTION

Figure 1:
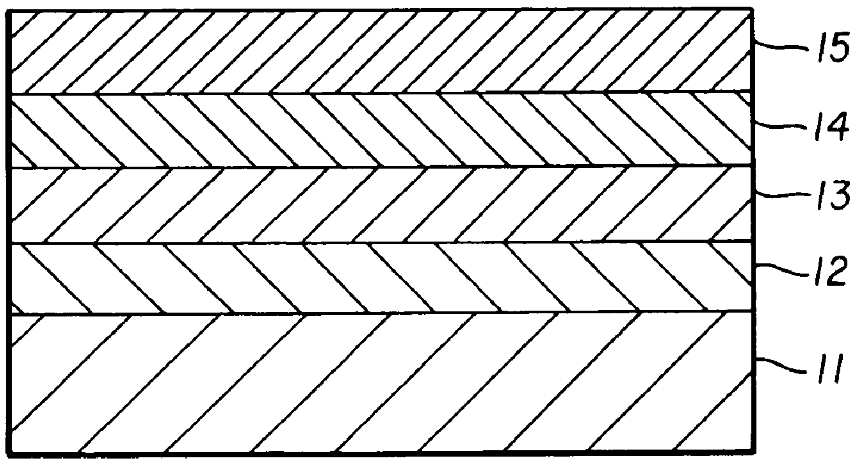
FIG. 1 illustrates an embodiment of a magnetic recording medium of the present invention.

FIG. 1 shows one embodiment of a magnetic recording medium of the present invention. Such a medium has a seed layer 12, a nonmagnetic underlayer 13, a magnetic layer 14, and a protective layer 15 formed, in this order, on a nonmetallic substrate 11 with its surface subjected to texturing. Note that the magnetic recording medium of the present invention shown in FIG. 1 is merely an illustrative example of a basic structure. The present invention is not limited to this particular construction. For example, as will be described later, an adhesive layer can be provided between the nonmetallic substrate 11 and the seed layer 12, and an intermediate layer or the like can be provided between the nonmagnetic underlayer 13 and the magnetic layer 14.

The nonmetallic substrate 11 can be substrate made of glass, monocrystalline silicon, ceramic, polycarbonate, or macromolecular resin. A glass or ceramic substrate is preferable from the viewpoint of cost and rigidity.

Texturing is processing that makes the surface of the nonmetallic substrate 11 undulating. The texture lines are made along the circumferential direction. The purpose of carrying out such texturing on the substrate surface is to orient the in-plane magnetization direction in the circumferential direction, which is the recording direction, thus creating magnetic anisotropy in the medium plane to realize high-density magnetic recording. Texturing can be carried out, for example, through mechanical polishing or polishing of the nonmetallic substrate surface using a cloth of polyester microfibers not containing polishing abrasive grains. To create the in-plane magnetic anisotropy and to minimize the flying height of a magnetic head to approximately 8 nm or less, it is preferable to provide surface roughness Ra of 0.1 to 1 nm, to raise the in-plane magnetic anisotropy to at least 1.2 nm, and to adjust the number of grooves formed on the surface to be 20 to 60 per $\mu$m. After texturing, it is preferable to further polish or smooth the surface of the nonmetallic substrate 11, such as tape polishing using an organic-acid-based washing liquid.

The seed layer 12 is covers the substrate surface to prevent alkali metals contained in the glass or the like, which is prone to corrosion, from leaching out, and to control the in-plane crystal orientation and control the crystal plane orientation of the underlayer and the magnetic layer deposited on the seed layer 12. As the material of the seed layer 12, Ni—P, W—Nb or Ni—Nb can be used. These materials are preferable because they provide a high in-plane magnetic anisotropy and a high remanent coercivity when oxygen or nitrogen concentration of the gas mixture during the deposition of the seed layer 12 is in a prescribed range. Note that Ni—P is particularly preferable since in the same Ni—P plating applied to an ordinary magnetic recording medium Ni—P plating can be used.

The above-mentioned Ni—P is preferably $Ni_{1-x}P_x$ (at %), where x is 0.15 to 0.35. At less than 0.15, magnetization will be prone to occurring and hence practical use as a medium will no longer be possible, whereas at more than 0.35, vaporization of the P will become very prone to occurring and hence it will become difficult to produce the target. More preferably, x is 0.18 to 0.27. The above-mentioned W—Nb is preferably $W_{1-x}Nb_x$ (at %), where x is 0.15 to 0.35. At less than 0.15, the lattice constant will become too large, which will be unsuitable for crystal growth of the underlayer 13 and the magnetic layer 14, whereas at more than 0.35, the target will become expensive due to being Nb-rich. More preferably, x is 0.2 to 0.3. The above-mentioned Ni—Nb is preferably $Ni_{1-x}Nb_x$ (at %), where x is 0.15 to 0.35. At less than 0.15, magnetization will be prone to occurring and hence practical use as a medium will no longer be possible, whereas at more than 0.35, the target will become expensive due to being Nb-rich. More preferably, x is 0.20 to 0.30.

The seed layer 12 can be deposited using a commonly-used film deposition method, such as vacuum deposition or sputtering carried out in a gas mixture of oxygen or nitrogen and an inert gas, such as argon or helium, after putting the substrate into a vacuum apparatus and evacuating to a vacuum (preferably less than $1.3\times10^{-5}$ Pa). By forming the film by deposition in a gas mixture containing oxygen or nitrogen, the crystal orientation of the magnetic layer 14 can be improved. If depositing a seed layer 12 comprising Ni—P, the oxygen concentration of the gas mixture of oxygen and an inert gas is made to be 0.15 to 0.55 vol %, preferably 0.20 to 0.45 vol %. If depositing a seed layer 12 comprising W—Nb, the nitrogen concentration of the gas mixture of nitrogen and an inert gas is made to be 1.8 to 3.6 vol %, preferably 1.8 to 2.7 vol %. If depositing a seed layer 12 comprising Ni—Nb, the nitrogen concentration of the gas mixture of nitrogen and an inert gas is made to be 0.4 to 3.6 vol %, preferably 0.4 to 1.8 vol %, more preferably 0.4 to 0.9 vol %. With the oxygen or nitrogen concentration range as described above, a high in-plane magnetic anisotropy and a high remanent coercivity can be obtained.

The seed layer 12 is preferably deposited while the substrate temperature is between room temperature (25° C.) and 300° C., and preferably under pressure between 0.2 and 2 Pa. The thickness of the seed layer 12 is preferably made to be 5 to 20 nm. To secure sufficient surface coverage, it is preferable for the thickness to be at least 5 nm, whereas if the thickness is high then the film deposition time takes long. Thus, it is preferable for the thickness to be not more than 20 nm.

Gas exposure surface treatment is carried out by exposing the surface of the seed layer 12 to oxygen or nitrogen. The surface treatment can be also carried out using a gas mixture of oxygen or nitrogen and an inert gas, such as argon. The surface treatment is carried out to control the film plane orientation of the subsequently formed underlayer 13 and to create a difference in the crystal strain between the circumferential direction and the radial direction in the film plane. It is thought that, as a result, the magnetic layer 14 has anisotropy in the crystal orientation in the film plane, and hence the medium provides an in-plane magnetic anisotropy.

When carrying out the surface treatment using a gas mixture of oxygen or nitrogen and an inert gas, to expose the substrate surface uniformly with the mixed gas, the oxygen or nitrogen concentration of the gas mixture is preferably 0.5 to 5 vol %, more preferably 1 to 3 vol %. Moreover, to maintain the uniformity of the in-plane magnetic anisotropy in the magnetic disk plane, and to increase the remanent coercivity, it is preferable to carry out the surface treatment for 0.5 to 5 seconds at a pressure of 0.2 to 2 Pa. Specifically, after depositing the seed layer 12 on the substrate 11 by sputtering inside a sputtering apparatus chamber, the surface treatment can be carried out by introducing a mixed gas of oxygen or nitrogen and an inert gas into the chamber using gas supply means, thus making the mixed gas come into contact with the surface of the seed layer 12. After exposing the surface of the seed layer 12 to the oxygen or nitrogen, texturing can be further carried out or not carried out on the surface; however, if texturing is carried out on the surface of the seed layer 12, it is preferable for the texture lines to run in the circumferential direction of the substrate, and it is preferable to make the surface roughness Ra be 0.1 to 1 nm.

The nonmagnetic underlayer 13 is intended to make the magnetic particles in the magnetic layer minute and uniform, and to reduce noise and thus improve the S/N ratio. The nonmagnetic underlayer 13 can be formed from any commonly-used nonmagnetic material that is capable of furnishing such a function. For example Cr, Cr—W, Cr—V, Cr—Mo, Cr—Si, Ni—Al, Mo, W, Pt, $Al_2O_3$ or the like can be used. The thickness of the nonmagnetic underlayer 13 is preferably 0.5 to 20 nm, more preferably 1.5 to 5 nm. The nonmagnetic underlayer 13 can be a single-layer film or a multi-layer film, and in the case of a multi-layer film, the various layers can be of different materials and thicknesses, or can be of the same material and thickness.

The nonmagnetic underlayer 13 can be deposited using a commonly-used film deposition method such as sputtering or vacuum deposition, and it is preferable to make the substrate temperature at the film deposition be 150 to 400° C., and the film deposition pressure be 0.067 to 2 Pa.

The magnetic layer 14 has a function of recording information. For the magnetic layer 14, it is preferable to use a material having Co as the principal component thereof. Co is a ferromagnetic material that has a close-packed hexagonal (hcp) structure and uniaxial crystal magnetic anisotropy, and hence is suitable as the material of the magnetic layer 14. It is preferable for at least one element selected from Cr, Mo, B, Mn, Ti, W, V, Ta, Zr, Hf, Cu, Pt, Ru, and Re to be added to the material of the magnetic layer 14. For making the crystal grains small and increasing the remanent coercivity and so on, having high quality (high S/N ratio and sufficient thermal stability) during high-density recording, and so on, it is preferable to use a CoCrTa, CoCrPt, CoCrPtB, CoCrPtTa, CoCrPtBCu, or CoCrPtTaB alloy, with the CoCrPtTa, CoCrPtB, or CoCrPtBCu alloy being particularly preferable. It is preferable to make the thickness of the magnetic layer 14 be 10 to 20 nm. It is preferable to make this thickness at least 10 nm to improve the thermal stability of the recording magnetization state so that recorded information will not be lost. On the other hand, it is preferable for this thickness to be not more than 20 nm to make the crystal grains small and thus decrease the medium noise and increase the recording density. The thickness of the magnetic layer 14 is more preferably 14 to 18 nm. The magnetic layer 14 can be a single-layer film or a multi-layer film. If a multi-layer film is used, the various layers can be of different materials and thicknesses, or can be of the same material and thickness.

The magnetic layer 14 can be deposited using a commonly-used film deposition method, such as sputtering or vacuum deposition, and it is preferable for the substrate to be during the film deposition to be 150 to 400° C., and the film deposition pressure to be 0.067 to 1.34 Pa. The surface of the magnetic layer 14 can be subjected to oxidation, nitriding or carbonization treatment.

A protective layer 15 can be formed on the magnetic layer 14 as desired. The protective layer 15 has a function of protecting the magnetic layer that forms the recording layer from impact with the head, and corrosion due to the corrosivity of the external environment and so on. Any commonly used material capable of furnishing such a function can be used. For example carbon, nitrogen-containing carbon, hydrogen-containing carbon, silicon oxide or the like can be used. The protective layer 15 can be formed using a commonly used method, such as sputtering or CVD (chemical vapor deposition). Moreover, the thickness of the protective layer 15 is preferably made to be 0.5 to 5 nm. The protective layer 15 can be a single-layer film or a multi-layer film.

Figure 2:
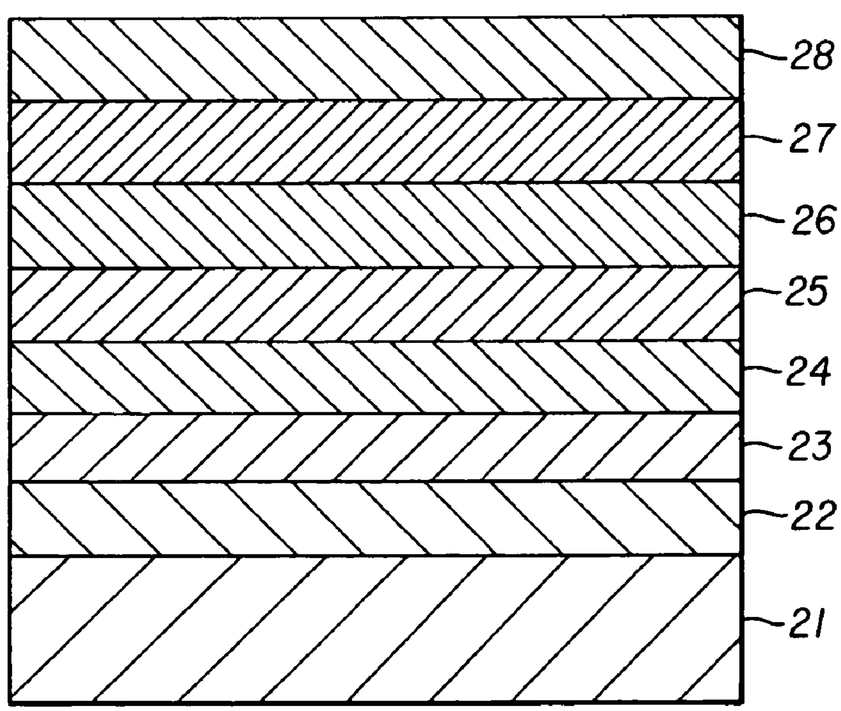
FIG. 2 illustrates another embodiment of a magnetic recording medium of the present invention.

FIG. 2 shows another embodiment of a magnetic recording medium of the present invention. Such an embodiment has an adhesive layer 22, a seed layer 23, a nonmagnetic underlayer 24, an intermediate layer 25, a magnetic layer 26, a protective layer 27, and a lubricating layer 28 formed, in this order, on a nonmetallic substrate 21 with its surface subjected to texturing. Note that the magnetic recording medium shown in FIG. 2 is also merely an illustrative example of the present invention. Accordingly, the magnetic recording medium of the present invention is not limited to this construction.

In the second embodiment, the nonmetallic substrate 21, the seed layer 23, the nonmagnetic underlayer 24, the magnetic layer 26, and the protective layer 27 can be formed as described earlier. The adhesive layer 22, the intermediate layer 25, the protective layer 27 and the lubricating layer 28 can be provided as desired. The adhesive layer 22 can be provided between the nonmetallic substrate 21 and the seed layer 23. The adhesive layer 22 has a function of preventing the film thereupon (the seed layer 23) from peeling off the substrate 21. The adhesive layer 22 can be formed from a material such as Cr, Ti, Ta, W, or an alloy thereof, and can be deposited using a commonly-used film deposition method, such as sputtering.

Moreover, the intermediate layer 25 can be provided between the nonmagnetic underlayer 24 and the magnetic layer 26. The intermediate layer 25 has a function of controlling the orientation of the magnetic layer and suppressing crystal stacking faults. The intermediate layer 25 can be formed from a material such as CoCr, CoCrB, CoCrTa, CoCrPtB, CoCrPtTa, or CoCrPtBTa, and can be deposited using a commonly used film deposition method such as sputtering.

Furthermore, the lubricating layer 28 can be provided on the protective layer 27. The lubricating layer 28 has a function of improving the function of the head flying over the medium, and preventing sticking of the head when operation is stopped (with a drive that does not use an unloading mechanism), and improving the environment resistance characteristics. The lubricating layer 28 can be a fluorine-type liquid lubricant such as a perfluoropolyether or the like, and can be formed using a commonly-used application method or the like.

The magnetic recording media of the present invention described above have high in-plane magnetic anisotropy (O.R.-Mrt) and remanent coercivity. With the magnetic recording medium of the present invention having a seed layer comprising Ni—P, if the oxygen concentration of the gas mixture when depositing the seed layer is 0.15 to 0.55 vol %, the magnetic recording medium of the present invention provides an O.R.-Mrt of at least 1.50, and a remanent coercivity of at least 3500 Oe. With the magnetic recording medium of the present invention having a seed layer comprising Ni—P, if the in-plane magnetic anisotropy is less than 1.50, then it will not be possible to make the magnetic layer sufficiently thin, and hence it will not be possible to achieve high-density recording through reduction of the medium noise. On the other hand, if the remanent coercivity is less than 3500 Oe, then the magnetization transition width will become broad and the S/N ratio will not be improved, and hence it will not be possible to achieve high-density recording. It is preferable for the oxygen concentration of the gas mixture when depositing the seed layer to be 0.20 to 0.45 vol %, for the magnetic recording medium to achieve an O.R.-Mrt of at least 1.60, and a remanent coercivity of at least 3700 Oe.

With the magnetic recording medium of the present invention having a seed layer comprising W—Nb, if the nitrogen concentration of the gas mixture when depositing the seed layer is 1.8 to 3.6 vol %, the magnetic recording medium provides an O.R.-Mrt of at least 1.30, and a remanent coercivity of at least 2800 Oe. If the in-plane magnetic anisotropy is less than 1.30, then it will not be possible to make the magnetic layer sufficiently thin, and hence it will not be possible to achieve high-density recording through reduction of the medium noise. On the other hand, if the remanent coercivity is less than 2800 Oe, then the magnetization transition width will become broad and the S/N ratio will not be improved, and hence it will not be possible to achieve high-density recording. It is preferable for the nitrogen concentration of the gas mixture when depositing the seed layer to be 1.8 to 2.7 vol %, and for the magnetic recording medium to achieve an O.R.-Mrt of at least 1.40, and a remanent coercivity of at least 3500 Oe.

With the magnetic recording medium of the present invention having a seed layer comprising Ni—Nb, if the nitrogen concentration of the gas mixture when depositing the seed layer is 0.4 to 3.6 vol %, the magnetic recording medium provides an O.R.-Mrt of at least 1.40, and a remanent coercivity of at least 3200 Oe. If the in-plane magnetic anisotropy is less than 1.40, then it will not be possible to make the magnetic layer sufficiently thin, and hence it will not be possible to achieve high-density recording through reduction of the medium noise. On the other hand, if the remanent coercivity is less than 3200 Oe, then the magnetization transition width will become broad and the S/N ratio will not be improved, and hence it will not be possible to achieve high-density recording. Furthermore, if the nitrogen concentration of the gas mixture when depositing the seed layer is 0.4 to 0.9 vol %, the magnetic recording medium achieves an O.R.-Mrt of at least 1.45, and a remanent coercivity of at least 3600 Oe.

Following is a description of the present invention through examples; however, the scope of the present invention is not limited to these examples.

In the first example, referring to FIG. 2, a magnetic recording medium was manufactured in which an adhesive layer, a seed layer comprising Ni—P, a nonmagnetic underlayer, an intermediate layer, a magnetic layer, and a protective layer were formed in this order on a glass substrate with its surface subjected to texturing. Following is a detailed description of the method of manufacturing the magnetic recording medium.

Texturing was carried out in the circumferential direction on a surface of a glass substrate (N5 substrate made by Hoya) as a nonmetallic substrate. Specifically, polishing was carried out on the surface of the glass substrate, thus adjusting the surface roughness Ra to 0.35 nm as measured using an AFM on a 30 $\mu$m-square area of the substrate surface, and the number of grooves formed on the substrate surface to 35 per $\mu$m as measured using an AFM on a 1 $\mu$m-square area of the substrate surface.

Regarding the polishing, the substrate was chucked onto a spindle and rotated at 300 rpm, and while feeding in a woven cloth of polyester microfibers (fiber diameter 1.51 $\mu$m) not containing polishing abrasive grains at 60 mm/min, the cloth was pushed against the substrate with a pushing pressure of 78.4 kPa (0.8 kgf/cm$^2$) via a pushing member of rubber hardness (according to IRHD pocket hardness test for spring-type medium hardness described in JIS K6253) 60° for 25 seconds while dripping a slurry containing 0.5 to 1 mass % of diamond abrasive grains of mean particle diameter 0.05 to 0.1 $\mu$m.

Next, the substrate was chucked onto a spindle and rotated at 300 rpm, and while feeding in a woven cloth of polyester microfibers (fiber diameter 1.5 $\mu$m) not containing polishing abrasive grains at 20 mm/min, the cloth was pushed against the substrate with a pushing pressure of 78.4 kPa (0.8 kgf/cm$^2$) via a pushing member of rubber hardness 60° for 25 seconds while dripping a washing liquid containing an organic-acid-type solvent but not containing abrasive grains.

After the washing, the substrate was put into a DC sputtering apparatus, and after evacuating to a vacuum, an adhesive layer comprising Cr was deposited with a substrate temperature at the film deposition of 25° C. and a film deposition pressure of 0.4 Pa. The thickness of the adhesive layer was made to be 1.2 nm.

Next, a seed layer comprising Ni—P20($Ni_{0.8}P_{0.2}$) was deposited with a substrate temperature at the film deposition of 25° C. and a film deposition pressure of 1.3 Pa in a gas mixture of oxygen and argon. The oxygen concentration was 0.4 vol %. The thickness of the seed layer was made to be 20 nm.

Next, the surface of the seed layer was subjected to gas exposure for 5 seconds at gas flow rate of 30 cc/min using a gas mixture of oxygen (concentration of 2 vol %) and argon.

A nonmagnetic underlayer comprising Cr of thickness 2.3 nm was deposited by sputtering with a substrate temperature at the film deposition of 300° C. and a film deposition pressure of 0.4 Pa, an intermediate layer comprising CoCr of thickness 1 nm was deposited by sputtering on the nonmagnetic underlayer with a substrate temperature at the film deposition of 300° C. and a film deposition pressure of 0.4 Pa, a magnetic layer comprising CoCrPtB of thickness 16.3 to 17 nm was deposited by sputtering on the intermediate layer with a substrate temperature at the film deposition of 300° C. and a film deposition pressure of 1 Pa, and then a carbon protective layer of thickness 5 nm was formed.

FIGS. 3 to 6 show magnetic characteristics of magnetic recording media obtained as described above, except that the oxygen concentration of the gas mixture was varied from 0 to 1.4 vol %. FIGS. 3, 4, 5, and 6 are graphs showing respectively the in-plane magnetic anisotropy (O.R.-Mrt), the thickness remanent magnetization product (Mrt), the remanent coercivity (Hcr), and the squareness ratio (the remanent coercivity squareness ratio S'), versus the oxygen concentration of the gas mixture when depositing the seed layer of magnetic recording media obtained as described above. When the oxygen concentration of the gas mixture when depositing the seed layer was 0.15 to 0.55 vol %, the O.R.-Mrt, the remanent coercivity (Hcr), the thickness remanent magnetization product (Mrt), and the squareness ratio (S') exhibited high values of at least 1.5, at least 3500 Oe, at least 0.35 memu/cm$^2$, and at least 0.7 respectively. When the oxygen concentration of the gas mixture when depositing the seed layer was 0.20 to 0.45 vol %, the O.R.-Mrt, the remanent coercivity (Her), the thickness remanent magnetization product (Mrt), and the squareness ratio (S') exhibited high values of at least 1.60, at least 3700 Oe, at least 0.35 memu/cm$^2$, and at least 0.75 respectively. At an oxygen concentration of 0.35 vol %, highly desirable values were exhibited, namely an O.R.-Mrt of 1.66, a remanent coercivity of 3814 Oe, a medium noise of 10.9, and an S/N ratio of 14.9.

Figure 7:
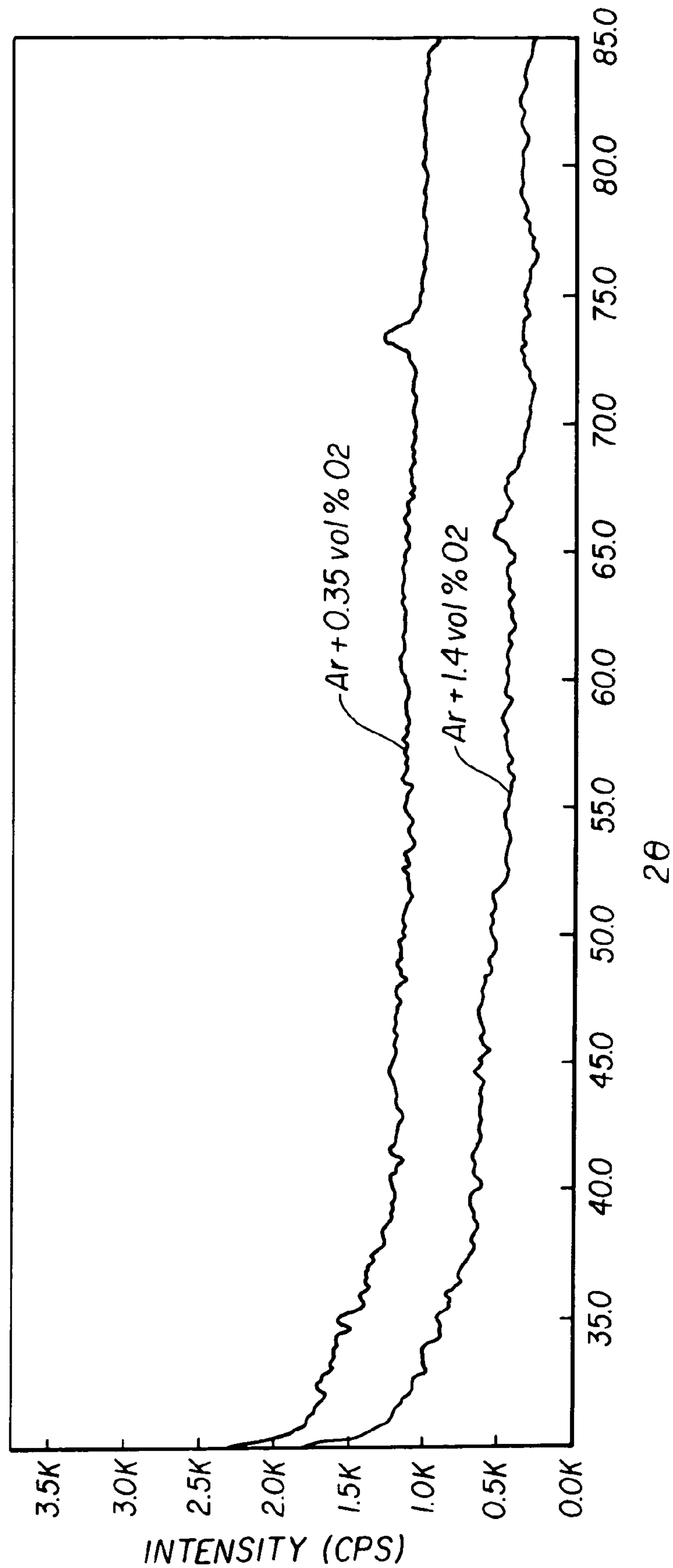
FIG. 7 illustrates a graph of an X-ray profile of a magnetic layer of a magnetic recording medium using an Ni—P seed layer.
Figure 8:
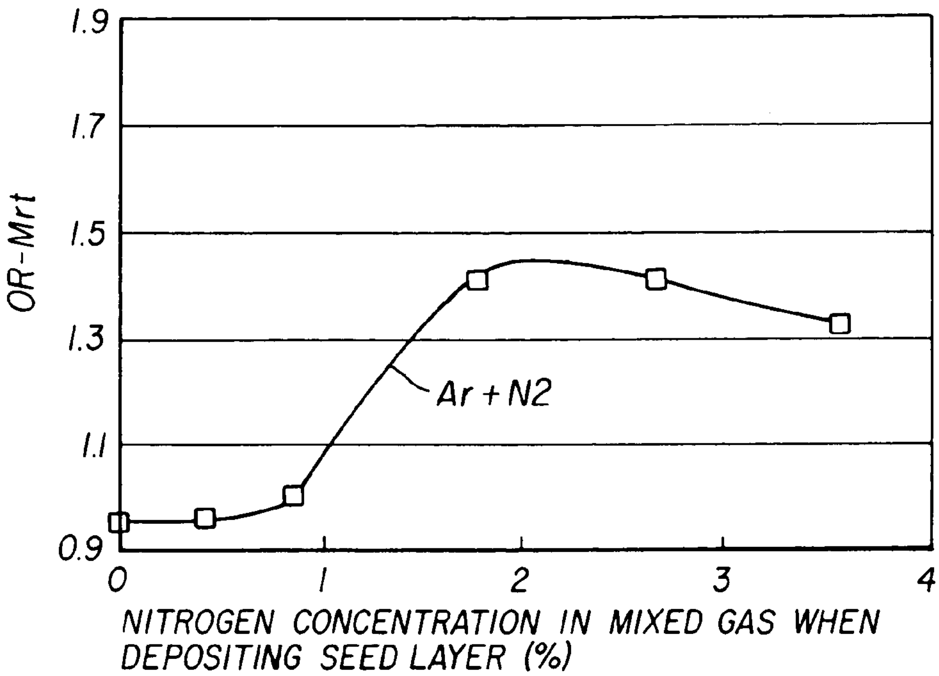
FIG. 8 illustrates a graph of in-plane magnetic anisotropy (O.R.-Mrt) versus nitrogen concentration of a gas mixture when depositing a seed layer.
Figure 9:
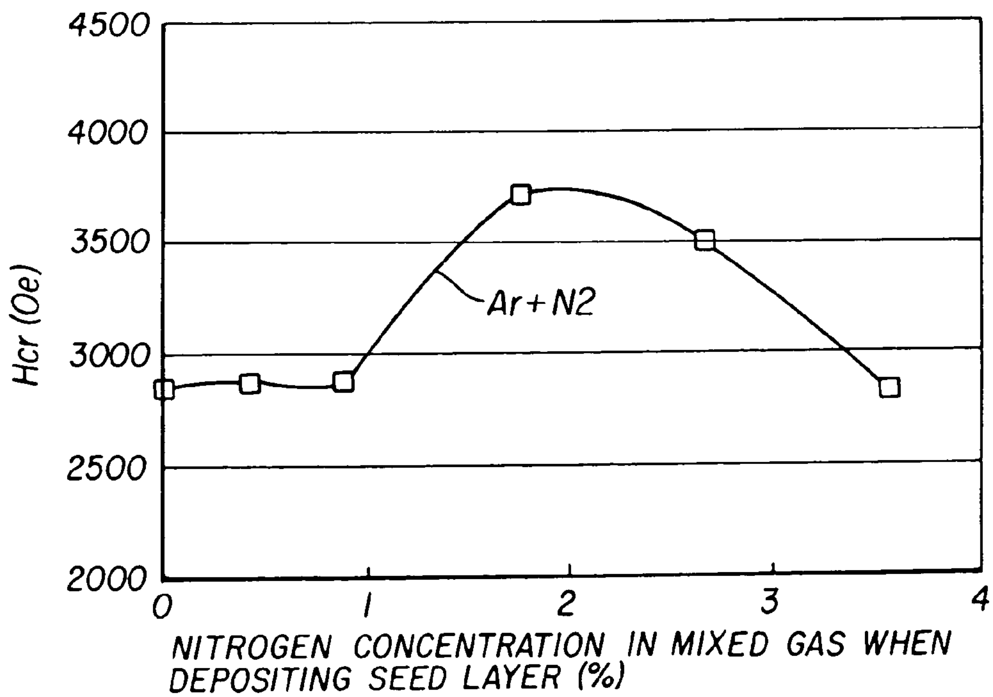
FIG. 9 illustrates a graph of remanent coercivity (Hcr) against the nitrogen concentration of the gas mixture when depositing the seed layer.
Figure 10:
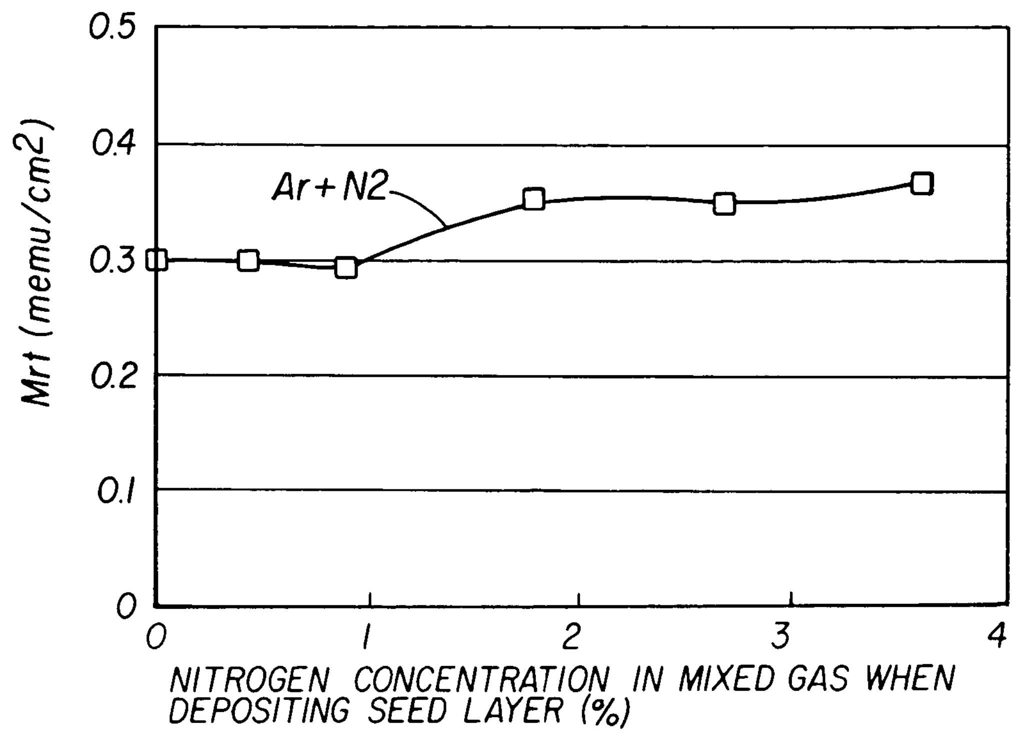
FIG. 10 illustrates a graph of thickness remanent magnetization product (Mrt) against the nitrogen concentration of the gas mixture when depositing the seed layer.
Figure 11:
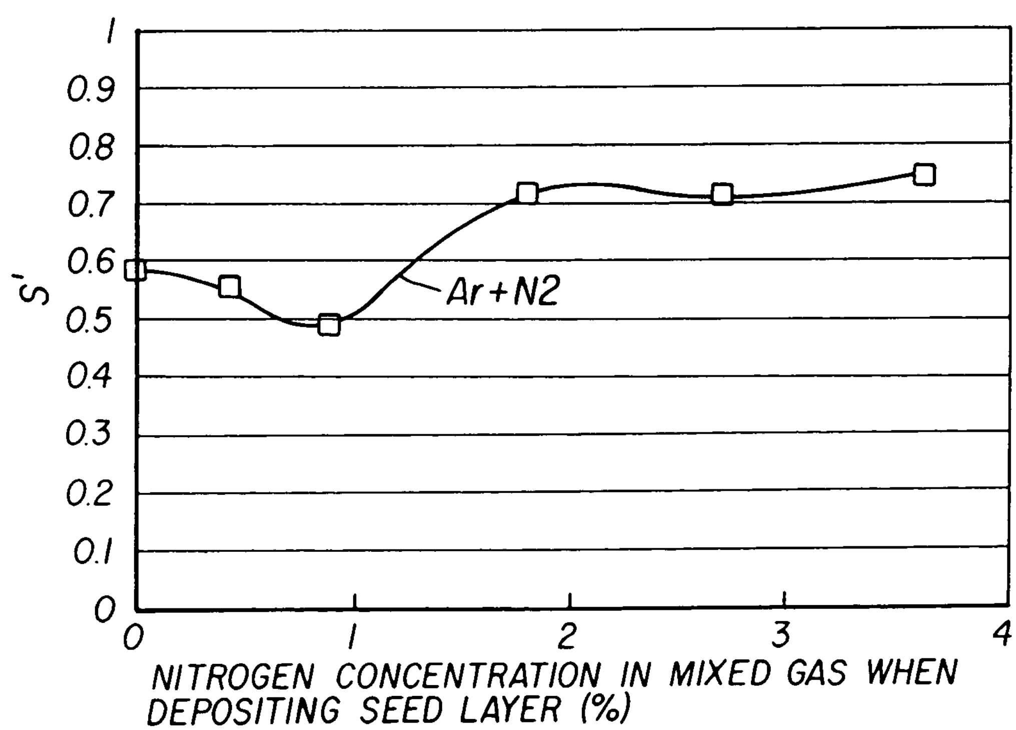
FIG. 11 illustrates a graph of remanent coercivity squareness ratio (S') against the nitrogen concentration of the gas mixture when depositing the seed layer.

FIG. 7 shows the results of structural analysis using X-ray diffraction by the θ–2θ method on the magnetic layer of magnetic recording media obtained as described above. The peak of Co(110) at d=1.287(2θ=73.5°) was detected with an oxygen concentration of 0.35 vol % when depositing the seed layer, but was not detected when the oxygen concentration was 1.4 vol %. This corresponds to the O.R.-Mrt becoming high where the Co(110) peak intensity is strong.

In the second example, referring to FIG. 2, a magnetic recording medium was manufactured in which an adhesive layer, a seed layer comprising W—Nb, a nonmagnetic underlayer, an intermediate layer, a magnetic layer, and a protective layer were formed in this order on a glass substrate with its surface subjected to texturing. Following is a detailed description of the method of manufacturing the magnetic recording medium.

As in the first example, texturing was carried out in the circumferential direction on a surface of a glass substrate (N5 substrate made by Hoya) as a nonmetallic substrate. Specifically, polishing was carried out on the surface of the glass substrate, thus adjusting the surface roughness Ra to 0.35 nm as measured using an AFM on a 30 $\mu$m-square area of the substrate surface, and the number of grooves formed on the substrate surface to 35 per $\mu$m as measured using an AFM on a 1 $\mu$m-square area of the substrate surface.

Regarding the polishing, the substrate was chucked onto a spindle and rotated at 300 rpm, and while feeding in a woven cloth of polyester microfibers (fiber diameter 1.5 $\mu$m) not containing polishing abrasive grains at 60 mm/min, the cloth was pushed against the substrate with a pushing pressure of 78.4 kPa (0.8 kgf/cm$^2$) via a pushing member of rubber hardness (according to IRHD pocket hardness test for spring-type medium hardness described in JIS K6253) 60° for 25 seconds while dripping a slurry containing 0.5 to 1 mass % of diamond abrasive grains of mean particle diameter 0.05 to 0.1 $\mu$m.

Next, the substrate was chucked onto a spindle and rotated at 300 rpm, and while feeding in a woven cloth of polyester microfibers (fiber diameter 1.5 $\mu$m) not containing polishing abrasive grains at 20 mm/min, the cloth was pushed against the substrate with a pushing pressure of 78.4 kPa (0.8 kgf/cm$^2$) via a pushing member of rubber hardness 60° for 25 seconds while dripping a washing liquid containing an organic-acid-type solvent but not containing abrasive grains.

After the washing, the substrate was put into a DC sputtering apparatus, and after evacuating to a vacuum, an adhesive layer comprising Cr was deposited with a substrate temperature at the film deposition of 25° C. and a film deposition pressure of 0.4 Pa. The thickness of the adhesive layer was made to be 1 nm.

Next, a seed layer comprising W—Nb25($W_{0.75}Nb_{0.25}$) was deposited with a substrate temperature at the film deposition of 25° C. and a film deposition pressure of 1.3 Pa in a gas mixture of nitrogen (concentration was 1.8 vol5) and argon. The thickness of the seed layer was made to be 20 nm.

Next, the surface of the seed layer was subjected to gas exposure for 5 seconds at gas flow rate of 30 cc/min using a gas mixture of oxygen (concentration of 2 vol %) and argon.

A nonmagnetic underlayer comprising Cr of thickness 2.3 nm was deposited by sputtering with a substrate temperature at the film deposition of 300° C. and a film deposition pressure of 0.4 Pa, an intermediate layer comprising CoCr of thickness 1 nm was deposited by sputtering on the nonmagnetic underlayer with a substrate temperature at the film deposition of 300° C. and a film deposition pressure of 0.4 Pa, a magnetic layer comprising CoCrPtB of thickness 16.3 to 17 nm was deposited by sputtering on the intermediate layer with a substrate temperature at the film deposition of 300° C. and a film deposition pressure of 1 Pa, and then a carbon protective layer of thickness 5 nm was formed.

FIGS. 8 to 11 show magnetic characteristics of magnetic recording media obtained as described above in the second example, except that the oxygen concentration of the gas mixture was varied from 0 to 3.6 vol %. FIGS. 8, 9, 10 and 11 are graphs showing respectively the in-plane magnetic anisotropy (O.R.-Mrt), the remanent coercivity (Hcr), the thickness remanent magnetization product (Mrt), and the squareness ratio (the remanent coercivity squareness ratio S'), versus the nitrogen concentration of the gas mixture when depositing the seed layer of magnetic recording media obtained as described above. When the nitrogen concentration of the gas mixture when depositing the seed layer was 1.8 to 3.6 vol %, the O.R.-Mrt, the remanent coercivity (Hcr), the thickness remanent magnetization product (Mrt), and the squareness ratio (S') exhibited high values of at least 1.30, at least 2800 Oe, at least 0.35 memu/cm$^2$, and at least 0.7 respectively. When the nitrogen concentration of the gas mixture when depositing the seed layer was 1.8 to 2.7 vol %, the O.R.-Mrt, the remanent coercivity (Hcr), the thickness remanent magnetization product (Mrt), and the squareness ratio (S') exhibited high values of at least 1.40, at least 3500 Oe, at least 0.35 memu/cm$^2$, and at least 0.70 respectively. At a nitrogen concentration of the gas mixture when depositing the seed layer of 1.8 vol %, highly desirable values were exhibited, namely an O.R.-Mrt of 1.42, a medium noise of 11.3, a remanent coercivity of 3700 Oe, and an S/N ratio of 13.6. A highly favorable medium noise and S/N ratio were also obtained at nitrogen concentrations of 2.7 vol % and 3.6 vol % (Table 2).

Figure 12:
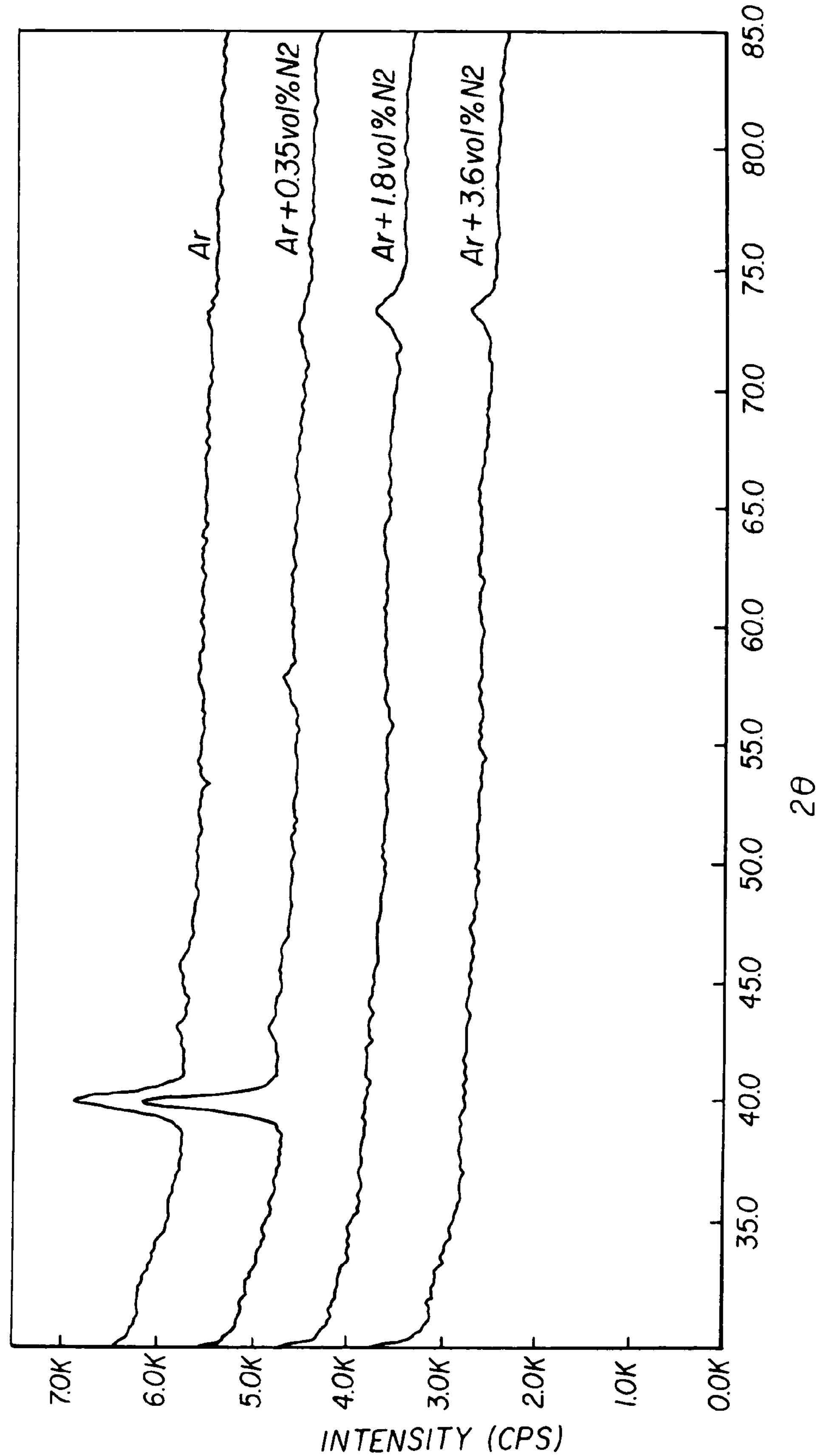
FIG. 12 illustrates a graph of an X-ray profile of a magnetic layer of a magnetic recording medium using a W—Nb seed layer.
Figure 13:
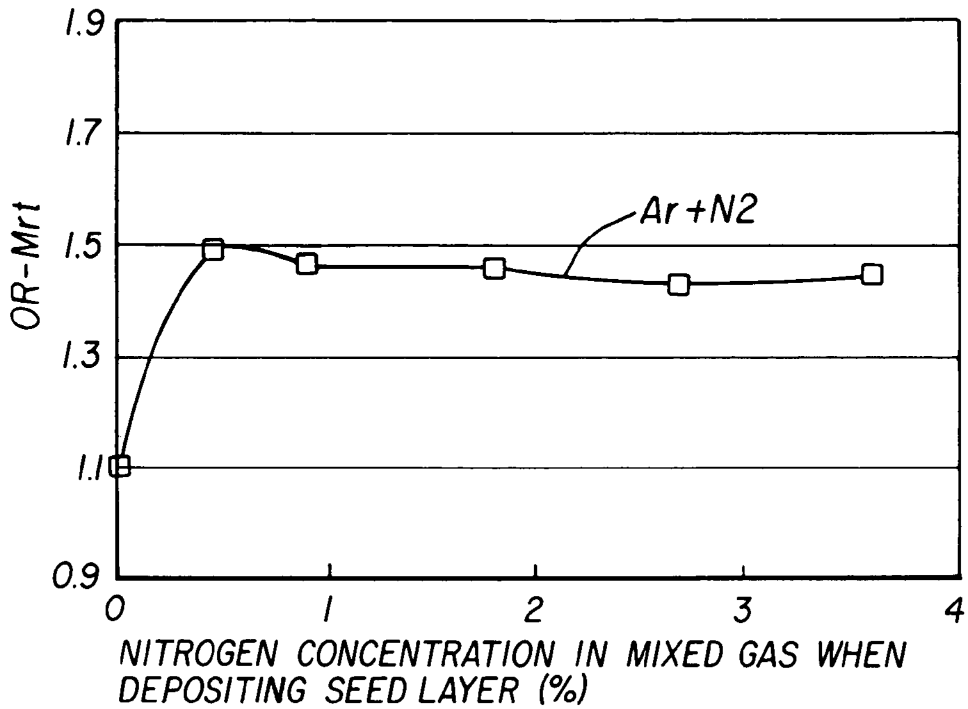
FIG. 13 illustrates a graph showing in-plane magnetic anisotropy (O.R.-Mrt) versus nitrogen concentration of a gas mixture when depositing a seed layer.
Figure 14:
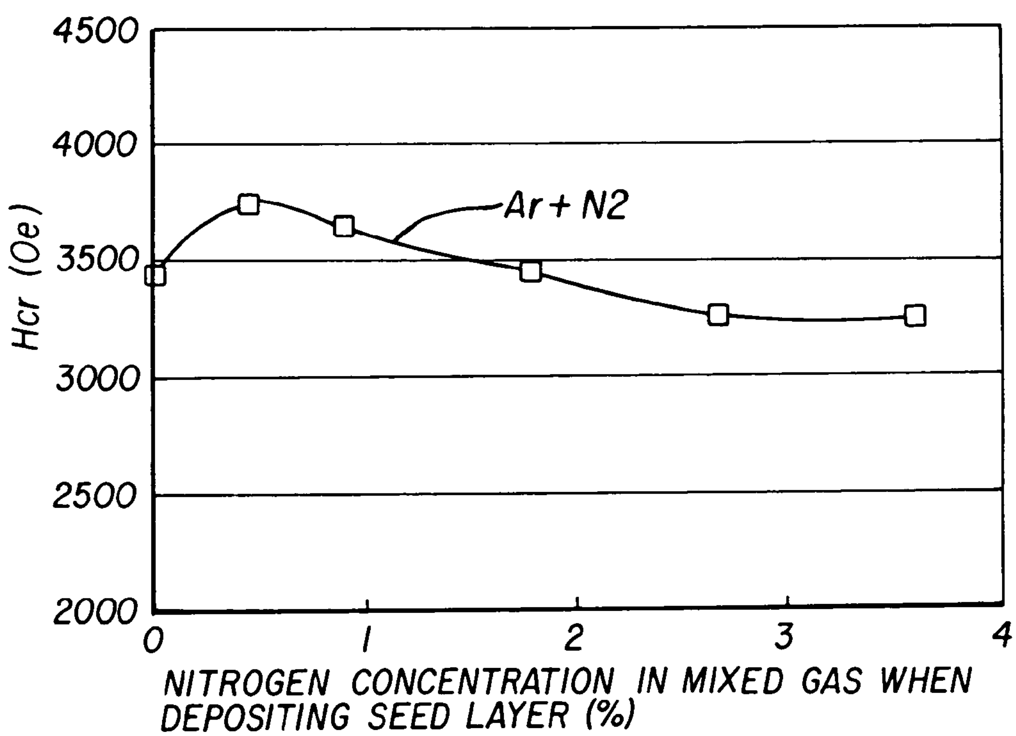
FIG. 14 illustrates a graph of remanent coercivity (Hcr) against the nitrogen concentration of the gas mixture when depositing the seed layer.
Figure 15:
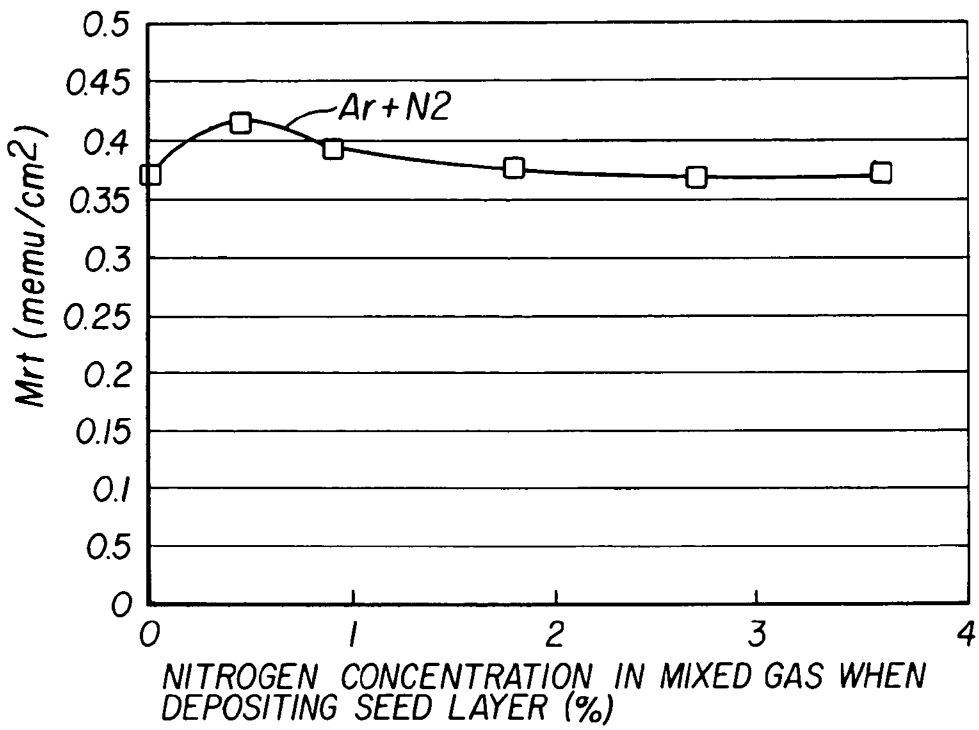
FIG. 15 illustrates a graph of thickness remanent magnetization product (Mrt) against the nitrogen concentration of the gas mixture when depositing the seed layer.
Figure 16:
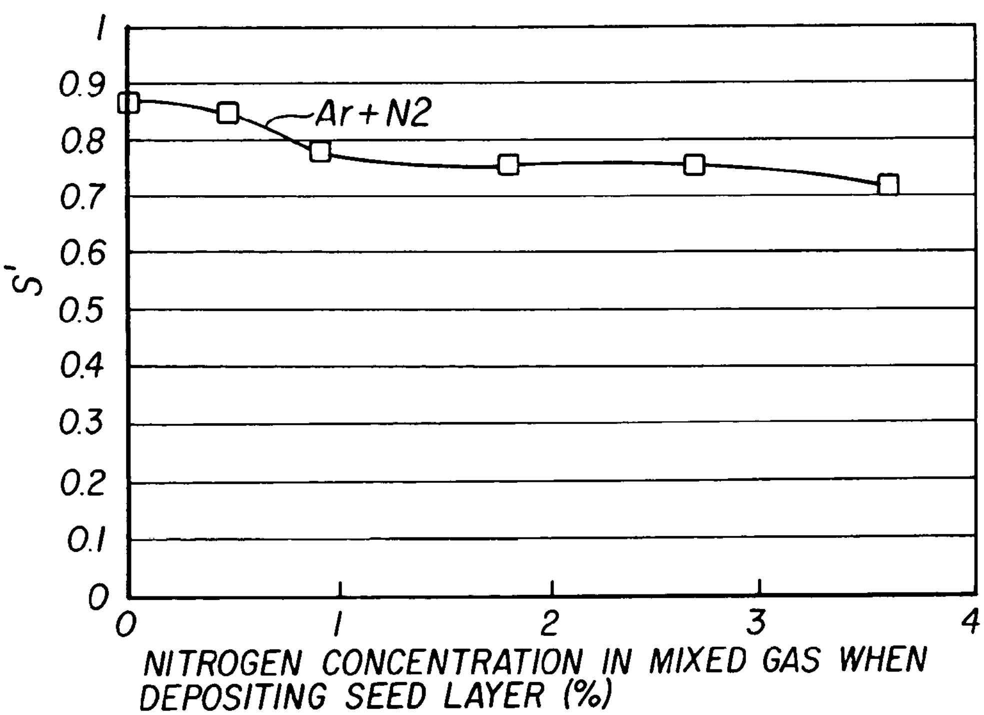
FIG. 16 illustrates a graph of remanent coercivity squareness ratio (S') against the nitrogen concentration of the gas mixture when depositing the seed layer.

FIG. 12 shows the results of structural analysis using X-ray diffraction by the θ–2θ method on the magnetic layer of magnetic recording media obtained as described above with respect to the second example. When gas doping was not carried out when depositing the seed layer, a peak appeared clearly close to d=2.249(2θ=40.1°). A similar peak was detected even with a nitrogen concentration of 0.35 vol %, but was not detected when the nitrogen concentration was 1.8 to 3.6 vol %. However, when the nitrogen concentration was 1.8 to 3.6 vol %, a Co(110) peak appeared clearly close to d=1.287(2θ=73.5°). This corresponds to the O.R.-Mrt becoming high where the Co(110) peak intensity is strong.

Figure 3:
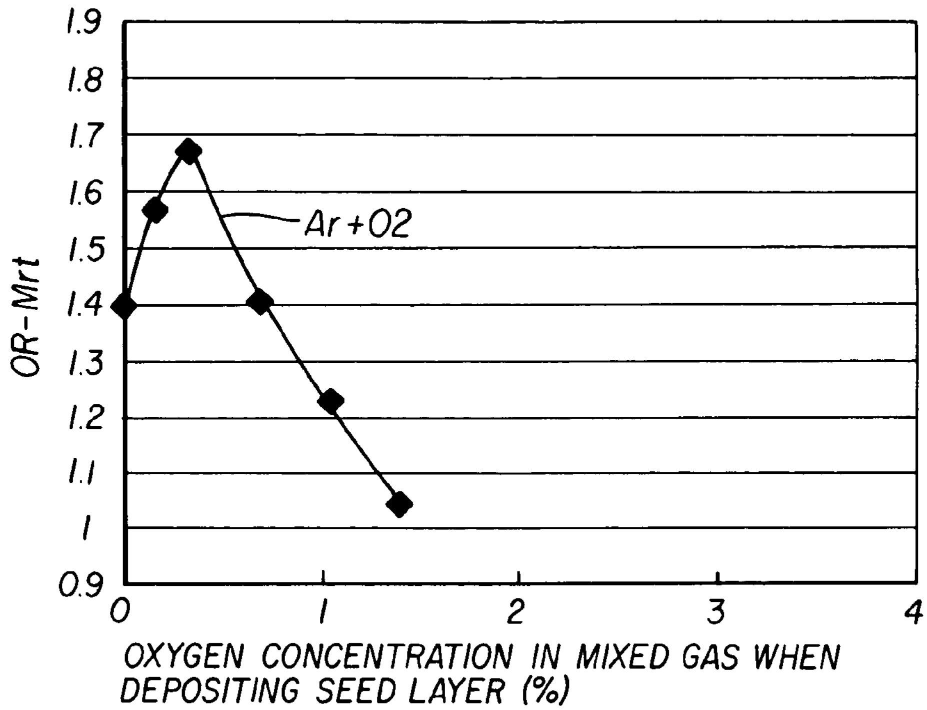
FIG. 3 illustrates a graph of in-plane magnetic anisotropy (O.R.-Mrt) versus oxygen concentration of a gas mixture when depositing a seed layer.
Figure 4:
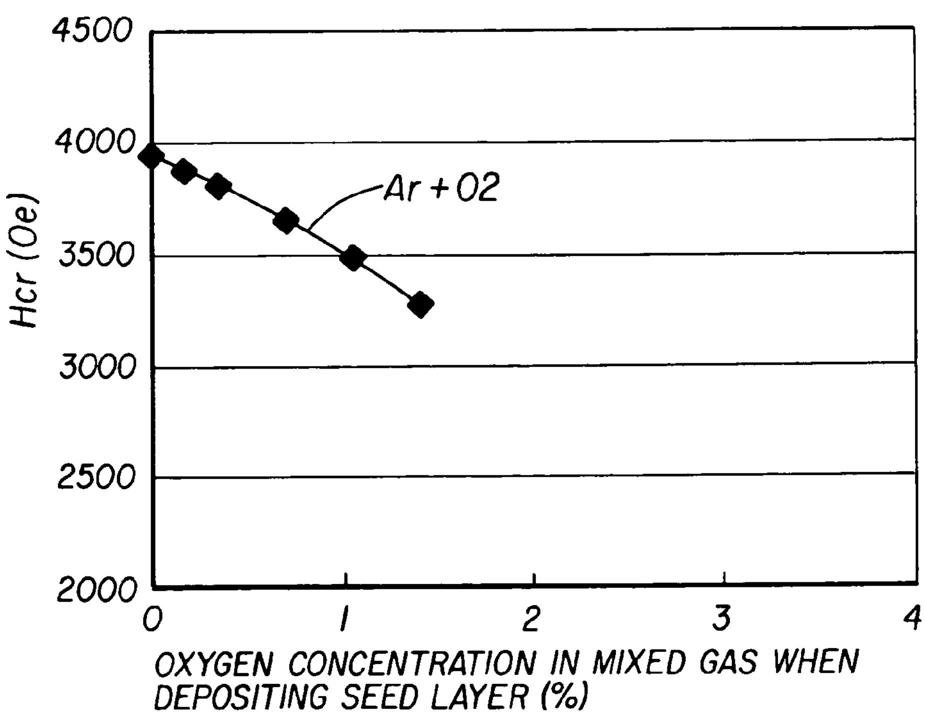
FIG. 4 illustrates a graph of remanent coercivity (Hcr) against the oxygen concentration of the gas mixture when depositing the seed layer.
Figure 5:
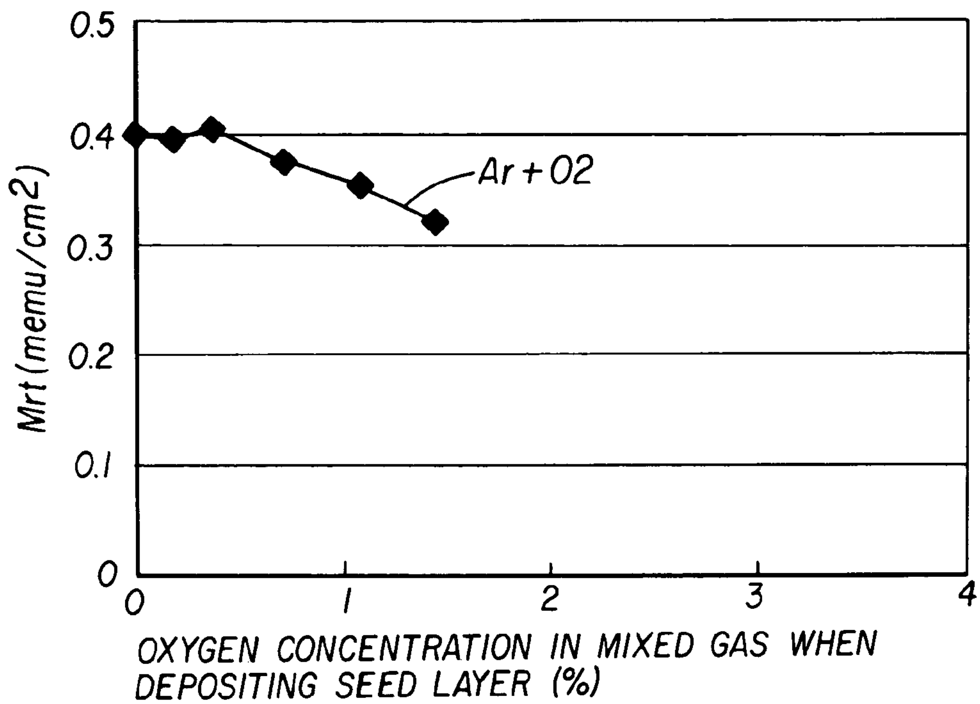
FIG. 5 illustrates a graph of thickness remanent magnetization product (Mrt) against the oxygen concentration of the gas mixture when depositing the seed layer.
Figure 6:
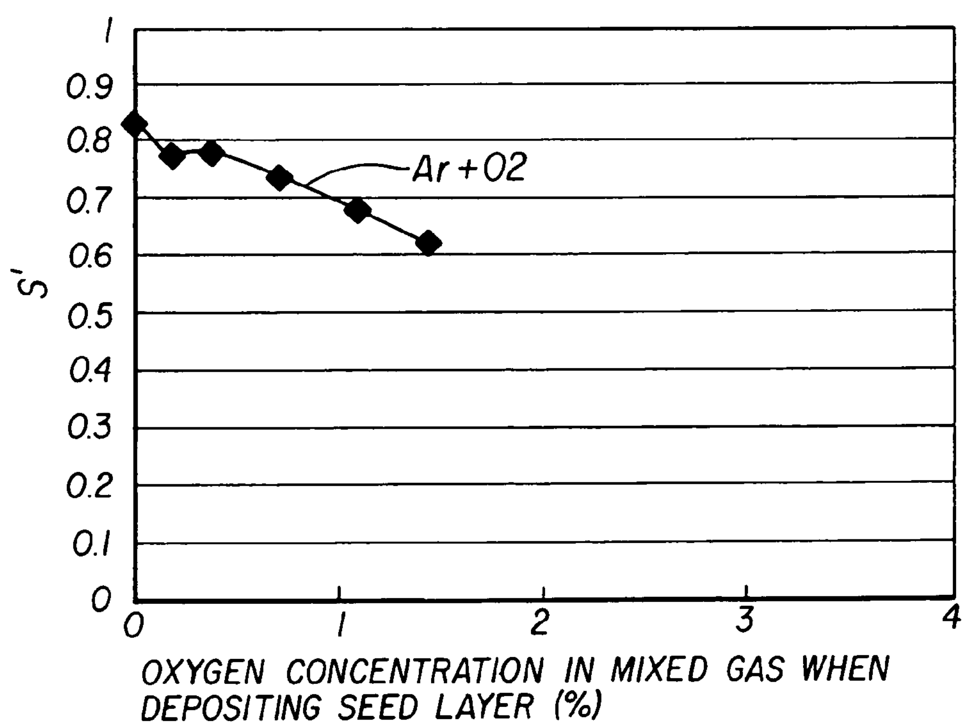
FIG. 6 illustrates a graph of remanent coercivity squareness ratio (S') against the oxygen concentration of the gas mixture when depositing the seed layer.

In the third example, referring to FIG. 3, a magnetic recording medium was manufactured in which an adhesive layer, a seed layer comprising Ni—Nb, a nonmagnetic underlayer, an intermediate layer, a magnetic layer, and a protective layer were formed, in this order, on a glass substrate with its surface subjected to texturing. Following is a detailed description of the method of manufacturing the magnetic recording medium according to the third example.

As in the first and second examples, texturing was carried out in the circumferential direction on a surface of a glass substrate (N5 substrate made by Hoya) as a nonmetallic substrate. Specifically, polishing was carried out on the surface of the glass substrate, thus adjusting the surface roughness Ra to 0.35 nm as measured using an AFM on a 30 μm-square area of the substrate surface, and the number of grooves formed on the substrate surface to 35 per μm as measured using an AFM on a 1 μm-square area of the substrate surface.

Regarding the polishing, the substrate was chucked onto a spindle and rotated at 300 rpm, and while feeding in a woven cloth of polyester microfibers (fiber diameter 1.5 μm) not containing polishing abrasive grains at 60 mm/min, the cloth was pushed against the substrate with a pushing pressure of 78.4 kPa (0.8 kgf/cm$^2$) via a pushing member of rubber hardness (according to IRHD pocket hardness test for spring-type medium hardness described in JIS K6253) 60° for 25 seconds while dripping a slurry containing 0.5 to 1 mass % of diamond abrasive grains of mean particle diameter 0.05 to 0.1 μm.

Next, the substrate was chucked onto a spindle and rotated at 300 rpm, and while feeding in a woven cloth of polyester microfibers (fiber diameter 1.5 μm) not containing polishing abrasive grains at 20 mm/min, the cloth was pushed against the substrate with a pushing pressure of 78.4 kPa (0.8 kgf/cm$^2$) via a pushing member of rubber hardness 60° for 25 seconds while dripping a washing liquid containing an organic-acid-type solvent but not containing abrasive grains.

After the washing, the substrate was put into a DC sputtering apparatus, and after evacuating to a vacuum, an adhesive layer comprising Cr was deposited with a substrate temperature at the film deposition of 25° C. and a film deposition pressure of 0.4 Pa. The thickness of the adhesive layer was made to be 1 nm.

Next, a seed layer comprising Ni—Nb30($Ni_{0.7}Nb_{0.3}$) was deposited with a substrate temperature at the film deposition of 25° C. and a film deposition pressure of 1.3 Pa in a gas mixture of nitrogen (concentration of 0 to 3/6 vol %) and argon. The thickness of the seed layer was made to be 20 nm.

Next, the surface of the seed layer was subjected to gas exposure for 5 seconds at gas flow rate of 30 cc/min using a mixed gas of oxygen (concentration of 2 vol %) and argon.

A nonmagnetic underlayer comprising Cr of thickness 2.3 nm was deposited by sputtering with a substrate temperature at the film deposition of 300° C. and a film deposition pressure of 0.4 Pa, an intermediate layer comprising CoCr of thickness 0.8 nm was deposited by sputtering on the nonmagnetic underlayer with a substrate temperature at the film deposition of 300° C. and a film deposition pressure of 0.4 Pa, a magnetic layer comprising CoCrPtB of thickness 16.5 nm was deposited by sputtering on the intermediate layer with a substrate temperature at the film deposition of 300° C. and a film deposition pressure of 1 Pa, and then a carbon protective layer of thickness 5 nm was formed.

FIGS. 13, 14, 15 and 16 are graphs showing respectively the in-plane magnetic anisotropy (O.R.-Mrt), the remanent coercivity (Hcr), the thickness remanent magnetization product (Mrt), and the squareness ratio (the remanent coercivity squareness ratio S'), versus the nitrogen concentration of the gas mixture when depositing the seed layer of magnetic recording media obtained as described above.

When the nitrogen concentration of the gas mixture when depositing the seed layer was 0.4 to 3.6 vol %, the O.R.-Mrt, the remanent coercivity (Hcr), the thickness remanent magnetization product (Mrt), and the squareness ratio (S') exhibited high values of at least 1.40, at least 3200 Oe, at least 0.35 memu/cm$^2$, and at least 0.7 respectively. When the nitrogen concentration of the mixed gas when depositing the seed layer was 0.4 to 1.8 vol %, the O.R.-Mrt, the remanent coercivity (Hcr), the thickness remanent magnetization product (Mrt), and the squareness ratio (S') exhibited high values of at least 1.45, at least 3400 Oe, at least 0.37 memu/cm$^2$, and at least 0.75 respectively. In the case that the nitrogen concentration of the gas mixture when depositing the seed layer was 0.4 to 0.9 vol %, the O.R.-Mrt, the remanent coercivity (Hcr), the thickness remanent magnetization product (Mrt), and the squareness ratio (S') exhibited high values of at least 1.45, at least 3600 Oe, at least 0.38 memu/cm$^2$, and at least 0.75 respectively. At a nitrogen concentration of the gas mixture when depositing the seed layer of 0.4 vol %, the values exhibited were an O.R.-Mrt of 1.49, a remanent coercivity of 3750 Oe, a medium noise of 15.0, and an S/N ratio of 11.4.

Figure 17:
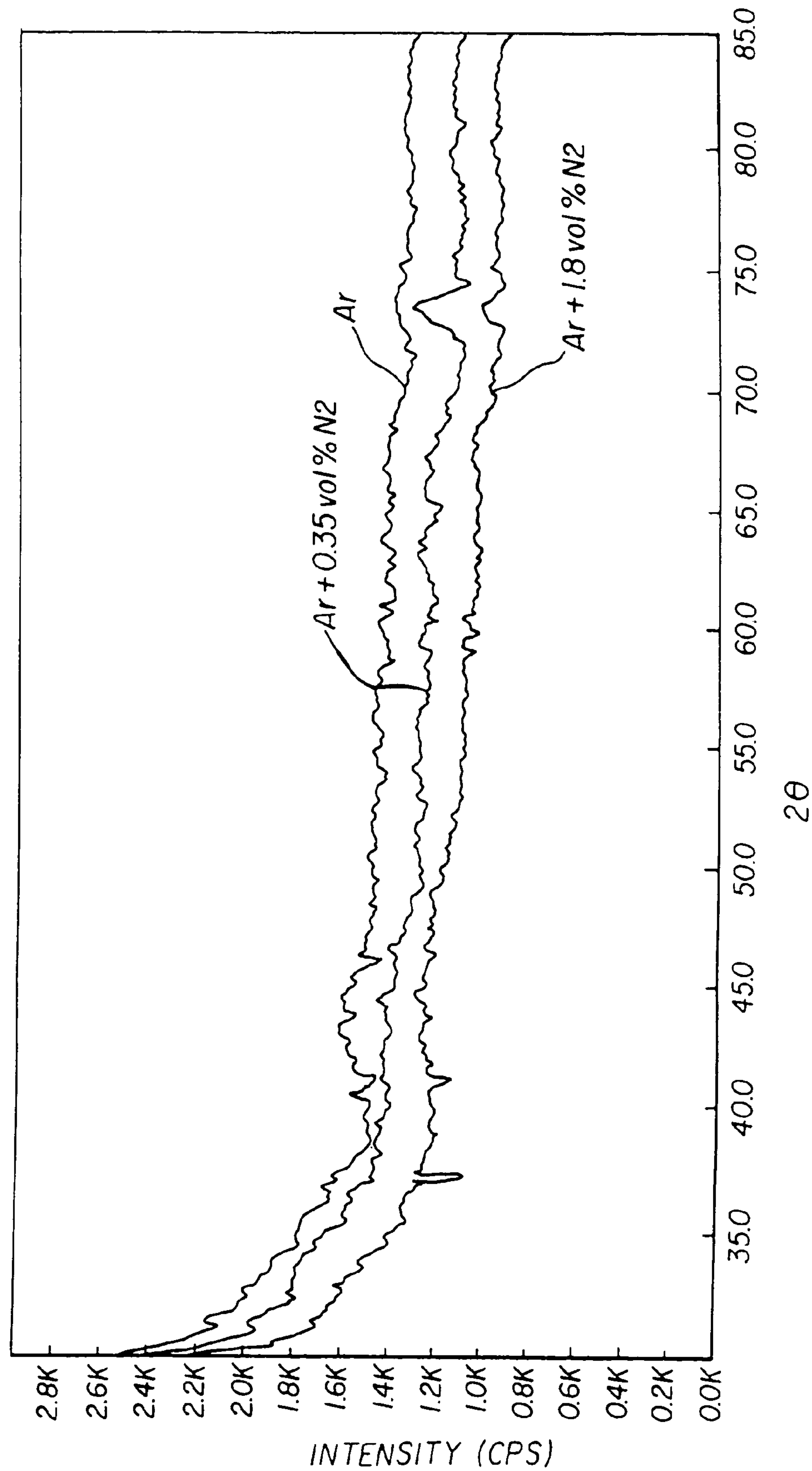
FIG. 17 illustrates a graph of an X-ray profile of a magnetic layer of a magnetic recording medium using an Ni—Nb seed layer.

FIG. 17 shows the results of structural analysis using X-ray diffraction by the θ–2θ method on the magnetic layer of magnetic recording media obtained as described above. When gas doping was not carried out when depositing the seed layer, peaks were not formed. At a nitrogen concentration of 0.35 vol %, a Co(110) peak appeared clearly close to d=1.287(2θ=73.5°). Furthermore, at a nitrogen concentration of 1.8 vol %, peaks were not detected. This corresponds to the O.R.-Mrt becoming high where the Co(110) peak intensity is strong.

The manufacturing conditions, magnetic characteristics and read and write characteristics for the magnetic recording media obtained as described above are collected together in Table 1 and 2. Table 1 and 2 shows the following measurement values:

| | |
|---|---|
| TAA: | The mean value over one cycle of the amplitude of the envelope waveform (units: μVp-p) |
| TAA-LF: | TAA in the case that the writing frequency is low |
| TAA-MF: | TAA in the case that the writing frequency is medium |
| TAA-1.5T: | TAA in the case that the writing frequency is high |
| Resolution: | The percentage ratio of TAA-MF to TAA-LF. |
| O/W: | After recording an LF signal, twenty times the log of the ratio of the LF playback output between after and before overwriting when an MF signal is overwritten (units: −dB); namely O/W = 20 log[(LF playback output after MF overwriting)/(LF playback output before MF overwriting)]. |
| PW50: | Half width of playback waveform during solitary wave signal recording (units: nm) |
| Medium noise: | The square root of the value obtained by subtracting the square of the integral noise caused by the head (Nh) and the square of the integral noise caused by the circuit (Nc) from the square of the integral noise of the playback waveform during 1.5T signal recording (Nt); namely $Nm = \sqrt{(Nt^2 - Nh^2 - Nc^2)}$. |
| S/N ratio: | twenty times the log of the ratio of TAA during 1.5T signal recording (μVp-p) and two times the medium noise (Nm (μV)) (dB);namely SNR = 20 log (TAA − 1.5T/2Nm) |

The magnetic characteristics, i.e., the in-plane magnetic anisotropy (O.R.-Mrt), the remanent coercivity (Hcr), the thickness remanent magnetization product (Mrt), and the squareness ratio (S') were obtained by taking measurements at the two points 0° and 180° with a radius of r=22 mm using an ORM measuring device (made by Innovated Instruments), and then taking the mean.

For $KuV/k_BT$, Hcr was measured with the magnetic field holding time being changed (1 to 100 s). It was obtained from $Hc(t)=H_0\{1-[(k_BT/KuV)\ln(At)]^n\}$. M. P. Sharrock, *Time dependence of switching field in magnetic recording media,* Journal of Applied Physics, Vol. 76 (1994), 6413–6418 was referred to.

For the electromagnetic conversion characteristics, an RW tester (made by Guzik; RWA-2585PRML, ANA985PRML, S-1701A) was used. A 40 Gbit/inch head was used as the magnetic head.

TABLE 1

| | Sputtering Conditions | | | Magnetic Characteristics | | | | |
|---|---|---|---|---|---|---|---|---|
| Example | Seed Layer Material | Deposition Gas | Thickness of Magnetic Layer (nm) | Hcr | Mrt | S' | O.R.-Mrt | KuV/kBT |
| 1 | Ni-P20 | Ar-0.35%$O_2$ | 17.0 | 3814 | 0.41 | 0.78 | 1.66 | 68 |
| 2 | Ni-P20 | Ar | 16.3 | 3950 | 0.40 | 0.83 | 1.39 | 78 |
| 3 | W-Nb25 | Ar-1.8%$N_2$ | 16.3 | 3700 | 0.35 | 0.71 | 1.42 | 70 |
| 4 | W-Nb25 | Ar-2.7%$N_2$ | 16.3 | 3500 | 0.35 | 0.71 | 1.42 | |
| 5 | W-Nb25 | Ar-3.6%$N_2$ | 16.3 | 2850 | 0.36 | 0.74 | 1.33 | |
| 6 | Ni-Nb30 | Ar-0.4%$N_2$ | 16.5 | 3750 | 0.41 | 0.85 | 1.49 | 76 |

TABLE 2

| | | | | | Read & Write Characteristics | | | |
|---|---|---|---|---|---|---|---|---|
| | | | | | Measurement Point | Measurement Radius (mm) | Rotational Speed (rpm) | Track Recording Density (kFCl) |
| | | | | | MD | 22.8 | 10,000 | 400.2 |
| | TAA Output ($\mu$Vp-p) | | | Resolution | | | Medium | S/N Ratio |
| Example | LF | MF | 1.5 T | (%) | OW (−dB) | Pw50 (nm) | Noise | (dB) |
| 1 | 743 | 541 | 377 | 72.8 | 28.1 | 106.9 | 10.9 | 14.9 |
| 2 | 713 | 511 | 358 | 71.7 | 28.6 | 109.8 | 14.7 | 11.8 |
| 3 | 700 | 492 | 338 | 70.3 | 28.4 | 110.6 | 11.3 | 13.6 |
| 4 | 698 | 489 | 333 | 70.0 | 25.8 | 111.0 | 10.9 | 13.7 |
| 5 | 702 | 488 | 333 | 69.3 | 27.6 | 110.8 | 11.0 | 13.7 |
| 6 | 718 | 509 | 355 | 71.0 | 29.7 | 110.2 | 15.0 | 11.4 |

As described above, according to the present invention, a magnetic recording medium that has a high in-plane magnetic anisotropy and a high remanent coercivity and hence is suitable for increasing recording density can be obtained.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2002-069260, in its entirety, including the drawings, claims, and the specification thereof, is incorporated herein by reference.

What is claimed is:

1. A method of manufacturing a magnetic recording medium, comprising the steps of:

texturing a surface of a nonmetallic substrate;

depositing a seed layer composed of Ni—P on the nonmetallic substrate;

exposing the surface of the seed layer to a gas containing at least one of oxygen or nitrogen;

depositing a nonmagnetic underlayer on the seed layer; and depositing a magnetic layer on the nonmagnetic underlayer, wherein the magnetic recording medium has an in-plane magnetic anisotropy of at least 1.30, and a remanent coercivity of at least 2800Oe, wherein the seed layer composed of Ni—P is deposited on the nonmetallic substrate in a gas mixture containing oxygen and an inert gas, the concentration of oxygen being 0.15 to 0.55 vol %.

2. The method according to claim 1, wherein the oxygen concentration in the gas mixture, when depositing the seed layer, is 0.20 to 0.45 vol %.

3. A method of manufacturing a magnetic recording medium, comprising the steps of:

texturing a surface of a nonmetallic substrate;

depositing a seed layer composed of W—Nb on the nonmetallic substrate;

exposing the surface of the seed layer to a gas containing at least one of oxygen or nitrogen;

depositing a nonmagnetic underlayer on the seed layer; and depositing a magnetic layer on the nonmagnetic underlayer, wherein the magnetic recording medium has an in-plane magnetic anisotrony of at least 1.30, and a remanent coercivity of at least 2800 Oe, wherein the seed layer composed of W—Nb is deposited on the nonmetallic substrate in a gas containing a mixture of nitrogen and other inert gas, the concentration of nitrogen being 1.8 to 3.6 vol %.

4. The method according to claim 3, wherein the nitrogen concentration in the gas mixture, when depositing the seed layer, is 1.8 to 2.7 vol %.

5. A method of manufacturing a magnetic recording medium, comprising the steps of:

texturing a surface of a nonmetallic substrate;

depositing a seed layer composed of Ni—Nb on the nonmetallic substrate;

exposing the surface of the seed layer to a gas containing at least one of oxygen or nitrogen;

depositing a nonmagnetic underlaver on the seed layer; and depositing a magnetic layer on the nonmagnetic undertayer, wherein the magnetic recording medium has an in-plane magnetic anisotropy of at least 1.30, and a remanent coercivity of at least 2800 Oe.

wherein the seed layer composed of Ni—Nb is deposited on the nonmetallic substrate in a gas mixture containing nitrogen and other inert gas, the concentration of nitrogen being 0.4 to 3.6 vol %.

6. The method according to claim 5, wherein the nitrogen concentration in the gas mixture, when depositing the seed layer, is 0.4 to 0.9 vol %.

7. The method according to claim 1, wherein the magnetic recording medium has an in-plane magnetic anisotropy of at least 1.50, and a remanent coercivity of at least 3500 Oe.

8. The method according to claim 3, wherein the magnetic recording medium has an in-plane magnetic anisotropy of at least 1.40, and a remanent coercivity of at least 3500 Oe.

9. The method according to claim 5, wherein the magnetic recording medium has an in-plane magnetic anisotropy of at least 1.40, and a remanent coercivity of at least 3200 Oe.

* * * * *

UNITED STATES PATENT AND TRADEMARK OFFICE

CERTIFICATE OF CORRECTION

PATENT NO. : 7,014,882 B2
APPLICATION NO. : 10/388366
DATED : March 21, 2006
INVENTOR(S) : Toyoji Ataka et al.

It is certified that error appears in the above-identified patent and that said Letters Patent is hereby corrected as shown below:

In Claim 5, column 16, line 42: “underlaver” should read as --underlayer--

In Claim 5, column 16, line 45: “undertayer” should read as --underlayer--

Signed and Sealed this

Fifteenth Day of August, 2006

JON W. DUDAS
*Director of the United States Patent and Trademark Office*